July 5, 1966 P. VALENTI 3,258,983
PRELOADED BALL SCREW AND NUT ASSEMBLY
Filed April 13, 1964

INVENTOR.
PETER VALENTI
BY
Lyon & Lyon
ATTORNEYS 3,258,983
PRELOADED BALL SCREW AND NUT ASSEMBLY
Peter Valenti, Whittier, Calif., assignor to Sargent Engineering Corporation, Huntington Park, Calif., a corporation of California
Filed Apr. 13, 1964, Ser. No. 358,988
7 Claims. (Cl. 74—409)

This invention relates to ball screw and nut assemblies of the general type shown in my prior Patent No. 2,907,223 for Jack Screw Drive.

The principal object of the present invention is to provide a ball screw and nut assembly in which backlash between the nut and the screw is substantially eliminated. This is achieved, in a preferred embodiment of the invention, by grinding or otherwise forming the grooves in the nut so that the helical lead near the center of the nut is different than the helical lead near the ends of the nut. The balls on one side of the central location ride on the left shoulder of the grooves of the nut while the balls on the other side of that location ride on the right shoulder of the grooves of the nut. The change in the lead or helix angle is such as to produce either a smaller helix angle or a greater helix angle for a short portion of the groove near the center of the nut.

Other and more detailed objects and advantages will appear hereinafter.

Figure 1:
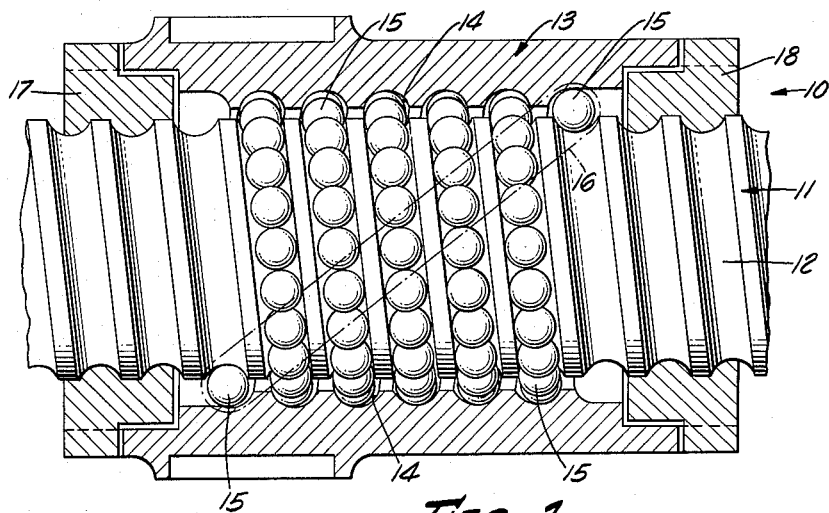
FIGURE 1 is a longitudinal sectional view showing a preferred embodiment of this invention.

Referring to the drawings, the ball screw and nut assembly generally designated 10 includes a screw 11 having a continuous external groove 12 of constant helical lead and helix angle. The nut 13 encircles a portion of the screw 12 and is provided with a continuous internal groove 14. Balls 15 are mounted in the grooves 12 and 14 and a conventional ball-return device is provided on the nut 13, as shown by phantom lines 16. The cross-sectional dimensions of the grooves 12 and 14, as shown in FIGURE 2, is slightly larger than that of the balls 15.

In accordance with this invention, the helical lead and helix angle of the groove 14 in the nut are the same for the portions of the groove near the opposite ends of the nut, but the helical lead and helix angle are different in a portion of the groove 14 at an intermediate location. In the form of the invention shown in FIGURES 1 and 2 of the drawings, the helical lead and helix angle are smaller for a central portion of the groove 14 than for the end portions of the groove 14 adjacent the opposite ends of the nut 13. Thus, the balls 15 adjacent the right-hand end of FIGURE 2 contact the right-hand flanks of the nut groove 14, whereas the balls 15 near the left-hand end of FIGURE 2 contact the left-hand flanks of the nut grooves 14. The ball 15 in the center, where the helix angle and helical lead change, is shown in mid position between right-hand and left-hand flanks of the grooves. The effect of this change in helical lead and helix angle is to preload the assembly 10 so that backlash is substantially eliminated.

Wipers 17 and 18 of conventional design may be mounted at opposite ends of the nut 13.

Figure 2:
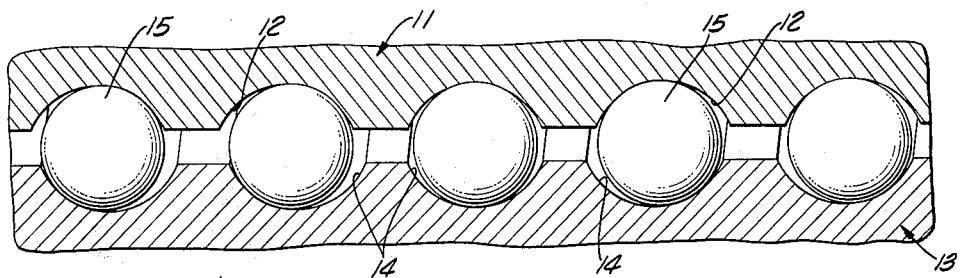
FIGURE 2 is a fragmentary sectional view showing a portion of FIGURE 1 on an enlarged scale.
Figure 3:
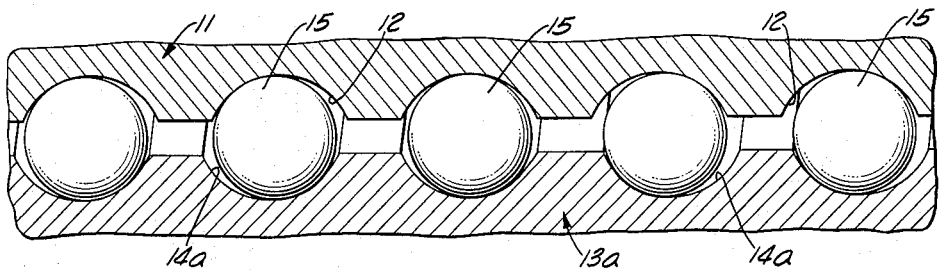
FIGURE 3 is a view similar to FIGURE 2 showing a modification.

In the modified form of the invention shown in FIGURE 2, the continuous external groove 12 on the screw 11 is constructed in the same manner as previously described, but the continuous internal groove 14a in the nut 13a has a portion intermediate its ends having a larger helix angle and helical lead. The result is that the balls 15 near the right-hand end of the nut 13a contact the left-hand flanks of the groove 14a while the balls 15 at the left-hand end contact the right-hand flanks of the grooves 14a. Backlash of the nut 13a relative to the screw 11 is substantially eliminated.

Having fully described my invention, it is to be understood that I am not to be limited to the details herein set forth, but that my invention is of the full scope of the appended claims.

I claim:

1. In a preloaded ball screw and nut assembly, the combination of: a screw having a continuous external ball-receiving groove of constant helical lead, a nut having a continuous internal ball-receiving groove, a plurality of balls in said grooves interposed between said screw and said nut, the portions of said internal groove adjacent the opposite ends of said nut having a helical lead which is the same as that of said external groove on said screw, and an intermediate portion of said internal groove having a different helical lead whereby backlash of the nut relative to the screw is minimized.

2. In a preloaded ball screw and nut assembly, the combination of: a screw having a continuous external ball-receiving groove of constant helical lead, a nut having a continuous internal ball-receiving groove, a plurality of balls in said grooves interposed between said screw and said nut, the portions of said internal groove adjacent the opposite ends of said nut having a helical lead which is the same as that of said external groove on said screw, and an intermediate portion of said internal groove having a smaller helical lead whereby backlash of the nut relative to the screw is minimized.

3. In a preloaded ball screw and nut assembly, the combination of: a screw having a continuous external ball-receiving groove of constant helical lead, a nut having a continuous internal ball-receiving groove, a plurality of balls in said grooves interposed between said screw and said nut, the portions of said internal groove adjacent the opposite ends of said nut having a helical lead which is the same as that of said external groove on said screw, and an intermediate portion of said internal groove having a greater helical lead whereby backlash of the nut relative to the screw is minimized.

4. A ball screw nut having a continuous internal ball-receiving groove, the groove having a helical lead which is the same adjacent opposite ends of the nut but which is different at an intermediate location therebetween.

5. A ball screw nut having a continuous internal ball-receiving groove, the groove having a helical lead which is the same adjacent opposite ends of the nut but which is smaller at an intermediate location therebetween.

6. A ball screw nut having a continuous internal ball-receiving groove, the groove having a helical lead which is the same adjacent opposite ends of the nut but which is greater at an intermediate location therebetween.

7. A ball screw nut having a continuous internal ball-receiving groove, the groove having one portion of a certain helical lead and having another portion of a different helical lead.

References Cited by the Examiner
UNITED STATES PATENTS
2,936,645  5/1960  Morris et al. _____ 74—441

DAVID J. WILLIAMOWSKY, Primary Examiner.
L. H. GERIN, Assistant Examiner.